United States Patent
Hrabe et al.

(10) Patent No.: US 11,865,731 B2
(45) Date of Patent: Jan. 9, 2024

(54) SYSTEMS, APPARATUSES, AND METHODS FOR DYNAMIC FILTERING OF HIGH INTENSITY BROADBAND ELECTROMAGNETIC WAVES FROM IMAGE DATA FROM A SENSOR COUPLED TO A ROBOT

(71) Applicant: Brain Corporation, San Diego, CA (US)

(72) Inventors: Thomas Hrabe, San Diego, CA (US); Abdolhamid Badiozamani, San Diego, CA (US)

(73) Assignee: Brain Corporation, San Diego, CA (US)

( * ) Notice: Subject to any disclaimer, the term of this patent is extended or adjusted under 35 U.S.C. 154(b) by 322 days.

(21) Appl. No.: 17/242,362

(22) Filed: Apr. 28, 2021

(65) Prior Publication Data
US 2021/0264572 A1 Aug. 26, 2021

Related U.S. Application Data

(63) Continuation of application No. PCT/US2019/058562, filed on Oct. 29, 2019.
(Continued)

(51) Int. Cl.
*G06T 7/136* (2017.01)
*B25J 9/16* (2006.01)
(Continued)

(52) U.S. Cl.
CPC .......... *B25J 9/1697* (2013.01); *G05D 1/0212* (2013.01); *G05D 1/0246* (2013.01);
(Continued)

(58) Field of Classification Search
CPC ....... B25J 9/1697; B25J 9/023; G05D 1/0212; G05D 1/0246; G05D 1/0274; G05D 2201/02; G05D 2201/0207; G06T 5/002; G06T 5/009; G06T 5/50; G06T 7/136; G06T 2207/20224; G06T 2207/30252;
(Continued)

(56) References Cited

U.S. PATENT DOCUMENTS 10,482,619 B2 * 11/2019 Ebrahimi Afrouzi ..... G06T 7/30
10,809,071 B2 * 10/2020 Afrouzi .................. G01S 17/89
(Continued)

OTHER PUBLICATIONS

International Search Report and Written Opinion dated Feb. 27, 2020 for PCT/US19/58562.
(Continued)

*Primary Examiner* — Jose L Couso
(74) *Attorney, Agent, or Firm* — Reed Smith LLP; Sidharth Kapoor

(57) ABSTRACT

Systems, apparatuses, and methods for dynamic filtering of high intensity broadband electromagnetic waves in image data from a sensor of a robot are disclosed herein. According to at least one non-limiting exemplary embodiment, sunlight or light emitted from nearby fluorescent lamps may cause a robot to generate false positives of objects nearby the robot as the light may be of high intensity and large bandwidth. These false positives may cause a robot to get stuck or navigate without use of a camera sensor, which may be unsafe.

25 Claims, 10 Drawing Sheets

Related U.S. Application Data

(60) Provisional application No. 62/752,059, filed on Oct. 29, 2018.

(51) Int. Cl.

| | | |
|---|---|---|
| *G05D 1/02* | (2020.01) | |
| *G06T 5/00* | (2006.01) | |
| *G06T 5/50* | (2006.01) | |
| *G06V 10/42* | (2022.01) | |
| *G06V 10/60* | (2022.01) | |
| *G06V 20/10* | (2022.01) | |
| *G06V 20/56* | (2022.01) | |

(52) U.S. Cl.
CPC .............. *G06T 5/002* (2013.01); *G06T 5/009* (2013.01); *G06T 5/50* (2013.01); *G06T 7/136* (2017.01); *G06V 10/431* (2022.01); *G06V 10/60* (2022.01); *G06V 20/10* (2022.01); *G06V 20/56* (2022.01); *G06T 2207/20224* (2013.01); *G06T 2207/30252* (2013.01)

(58) Field of Classification Search
CPC ....... G06T 1/0014; G06T 5/001; G06T 5/007; G06T 15/50; G06V 10/431; G06V 10/60; G06V 20/10; G06V 20/56; G06V 10/88; G06V 10/89; G06V 30/18124; G05B 2219/39391; G05B 2219/31028; G05B 2219/37009; G05B 2219/37015; G05B 2219/37017; G05B 2219/37567; G05B 2219/37572; H04N 7/1802; H04N 2201/0464

See application file for complete search history.

(56) References Cited

U.S. PATENT DOCUMENTS

| | | | |
|---|---|---|---|
| 2010/0245634 A1* | 9/2010 | Ahdoot | H04N 23/84 |
| | | | 348/E5.079 |
| 2010/0284626 A1* | 11/2010 | Malm | G06T 5/40 |
| | | | 382/260 |
| 2011/0293179 A1 | 12/2011 | Dikmen et al. | |
| 2016/0004923 A1 | 1/2016 | Piekniewski et al. | |
| 2016/0016311 A1 | 1/2016 | Konolige et al. | |
| 2016/0339587 A1 | 11/2016 | Rublee | |
| 2017/0291301 A1 | 10/2017 | Ibarz Gabardos et al. | |

OTHER PUBLICATIONS

Masullo et al. "Automated mask generation for PIV image analysis based on pixel intensity statistics," Experiments in Fluids. May 23, 2017, Retrieved on Feb. 2, 2020 from <https://link.springer.com/contentt/pdf/10.1007%2Fs00348-017-2357-3.pdf> entire document.

* cited by examiner

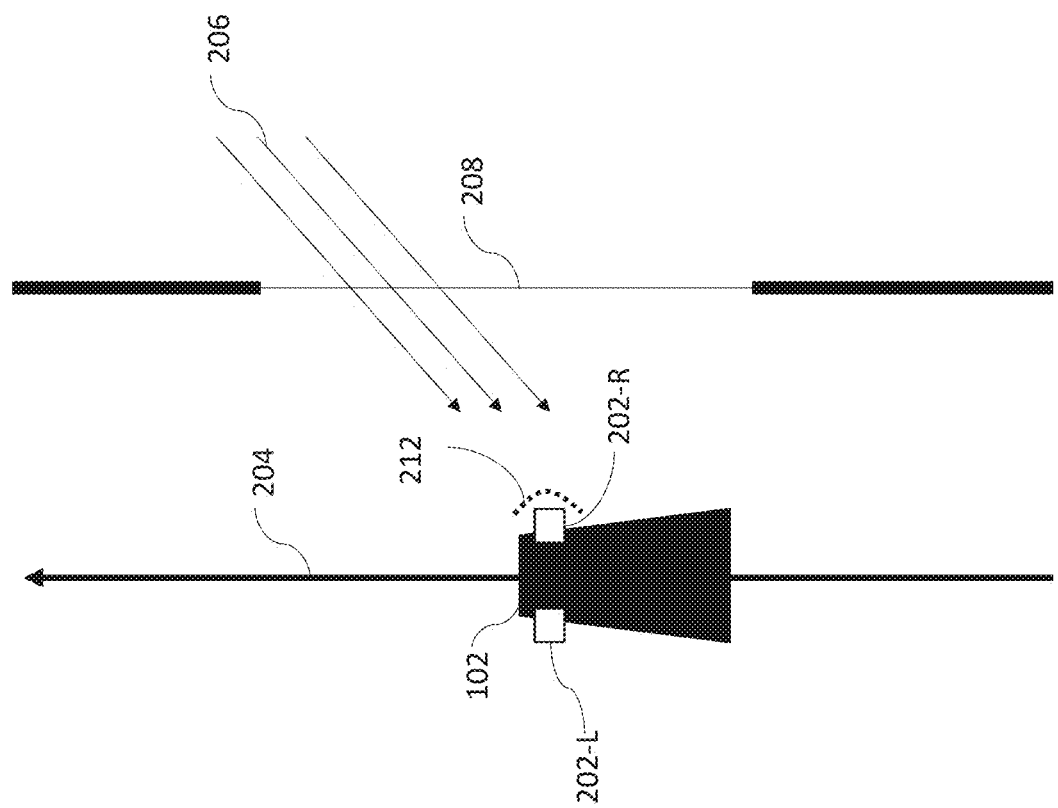

SYSTEMS, APPARATUSES, AND METHODS FOR DYNAMIC FILTERING OF HIGH INTENSITY BROADBAND ELECTROMAGNETIC WAVES FROM IMAGE DATA FROM A SENSOR COUPLED TO A ROBOT

PRIORITY

This application is a continuation of International Patent Application No. PCT/US19/58562 filed Oct. 29, 2019 and claims the benefit of U.S. Provisional Patent Application Ser. No. 62/752,059 filed on Oct. 29, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application generally relates to robotics and autonomous vehicles, and more specifically to systems, apparatuses, and methods for dynamic filtering of high intensity broadband electromagnetic waves, such as sunlight ranging from infrared to ultraviolet rays, from image data captured or obtained by a sensor coupled to a robot or autonomous vehicle.

Background

Currently, robots may comprise a plurality of imaging sensors such as cameras. These cameras may be configurable to capture grayscale images, color images, or images in particular frequency bandwidths (e.g., ultraviolet, infrared, etc.). Sunlight provides a unique problem for these cameras as sunlight comprises a nonzero intensity across a large bandwidth encompassing the ultraviolet, visible, and infrared spectrum.

Sunlight reaching a camera sensor may generate high intensity noise, especially in grayscale cameras. This high intensity noise may cause an image from an imaging camera to become too noisy to distinguish objects or features within the image. A robot utilizing imaging cameras to detect nearby objects may detect false positives nearby the robot if images from the imaging cameras comprise high intensity noise due to sunlight.

The noisy images may greatly inhibit the ability of the robot to navigate and, in some cases, may cause the robot to be stuck due to false positives generated by the sunlight noise. Accordingly, there is a need in the art for improved systems and methods for detecting and eliminating noise due to sunlight in images received by an imaging camera coupled to a robot.

SUMMARY

The foregoing needs are satisfied by the present disclosure, which provides for, inter alia, systems, apparatuses, and methods for dynamic filtering of high intensity broadband electromagnetic waves from image data captured or obtain by a sensor coupled to a robot.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a robotic system and a method to operate the same is disclosed. The robotic system comprises of a non-transitory memory having computer readable instructions stored thereon; and at least one processor device configurable to execute the computer readable instructions to: obtain at least one image captured by a sensor coupled to the robotic system at a first time instance at a first location of a route traveled by the robotic system; detect at least one region of pixels within the respective at least one image comprising a mean intensity value exceeding a dynamic lighting intensity threshold; apply at least one mask to the at least one region such that the false positive is not detected as the robotic system travels the route at the first location at a subsequent second time instance; and maneuver the robotic system past the first location with the application of the at least one mask such that the false positive is no longer detected at the first location.

According to at least one non-limiting exemplary embodiment, the least one processor device may be further configurable to execute the computer readable instructions to add the at least one image to an image frame queue such that the image frame queue comprises a plurality of images. The dynamic light intensity threshold is based on a mean light intensity value of a plurality of images captured by the sensor in real-time, the plurality of images present in an image frame queue, the mean light intensity value is configurable to adjust in real-time as additional images are captured by the sensor as the robotic system travels the route, the adjusting of the mean light intensity value corresponds to adjusting of the dynamic light intensity threshold.

According to at least one non-limiting exemplary embodiment, the least one processor device may be further configurable to execute the computer readable instructions to store the at least one image in an image frame queue without applying the at least one mask if the mean light intensity value does not exceed the dynamic lighting intensity threshold. The at least one mask comprises a pixel-wise determination of the false positive based on the dynamic light intensity threshold, and The determined pixels of the false positive is masked to eliminate the false positive from the at least one image.

According to at least one non-limiting exemplary embodiment, the at least one processing device is coupled to an image frame queuing unit, the image frame queuing unit configurable to determine intensity values of respective images of the plurality of images within an image frame queue. The image frame queuing unit comprises a respective intensity value corresponding to a respective image of the plurality of images stored in the image frame queue. The image frame queuing unit comprises the mean intensity value that is an average of the respective intensity value corresponding to the respective image of the plurality of images.

According to at least one non-limiting exemplary embodiment, the least one processor device may be further configurable to execute the computer readable instructions to remove the at least one mask after the robotic system travels past the first location. According to at least one non-limiting exemplary embodiment, the false positive detected may be a representation of high intensity broadband electromagnetic waves captured by the at least one sensor.

Similarly, a method for traveling along a trajectory is disclosed. The method comprising, obtaining at least one image captured by a sensor coupled to the robotic system at a first time instance at a first location of a route traveled by the robotic system; detecting at least one region of pixels within the respective at least one image comprising a mean intensity value exceeding a dynamic lighting intensity threshold; applying at least one mask to the at least one region such that the false positive is not detected as the robotic system travels the route at the first location at a subsequent second time instance; and maneuvering the robotic system past the first location with the application of the at least one mask such that the false positive is no longer detected at the first location. Further, the method comprises adding the at least one image to an image frame queue such that the image frame queue comprises a plurality of images; and storing the at least one image in an image frame queue without applying the at least one mask if the mean light intensity value does not exceed the dynamic lighting intensity threshold. Wherein, the dynamic light intensity threshold is based on a mean light intensity value of a plurality of images captured by the sensor in real-time, the plurality of images present in an image frame queue, the mean light intensity value is configurable to adjust in real-time as additional images are captured by the sensor as the robotic system travels the route, the adjusting of the mean light intensity value corresponds to adjusting of the dynamic light intensity threshold. And, the at least one mask comprises a pixel-wise determination of the false positive based on the dynamic light intensity threshold, and the determined pixels of the false positive is masked to eliminate the false positive from the at least one image.

The method further comprising: determining intensity values of respective images of the plurality of images within an image frame queue; a respective intensity value corresponding to a respective image of the plurality of images stored in the image frame queue; removing the at least one mask after the robotic system travels past the first location. Wherein, the mean intensity value that is an average of the respective intensity value corresponding to the respective image of the plurality of images, and the false positive detected is a representation of high intensity broadband electromagnetic waves captured by the at least one sensor.

According to another example embodiment, a non-transitory computer readable medium is disclosed. The non-transitory computer readable medium having computer readable instructions stored thereon that when executed by at least one processor device configure the at least one processor device to, maneuver, at a first time instance, a robot along a first trajectory along a path; detect, at the first time instance, a high intensity broadband electromagnetic wave by a sensor coupled to the robot while the robot maneuvers along the first trajectory; and maneuver, at the first time instance, the robot along a second trajectory along the path upon identifying a false positive along the first trajectory due to the detection of the high intensity broadband electromagnetic wave, the second trajectory being different than the first trajectory. Further, the at least one processor device is further configured to execute the computer readable instructions to disregard, at a second time instance, the false positive identified along the first trajectory during the first time instance; maneuver, at the second time instance, the robot along the first trajectory such that the false positive identified along the first trajectory during the first time instance is disregarded; and apply at least one mask such that the false positive is not detected as the robot travels the first trajectory along the path. Wherein, the high intensity broadband electromagnetic wave corresponds to sunlight, flashlight, floodlight, or equivalents thereof; and the identifying of the false positive is based on the sensor detecting the high intensity broadband electromagnetic wave.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 2C illustrates a robot applying a mask to a camera sensor upon the camera sensor perceiving noise due to sunlight, according to an exemplary embodiment.

Figure 1A:
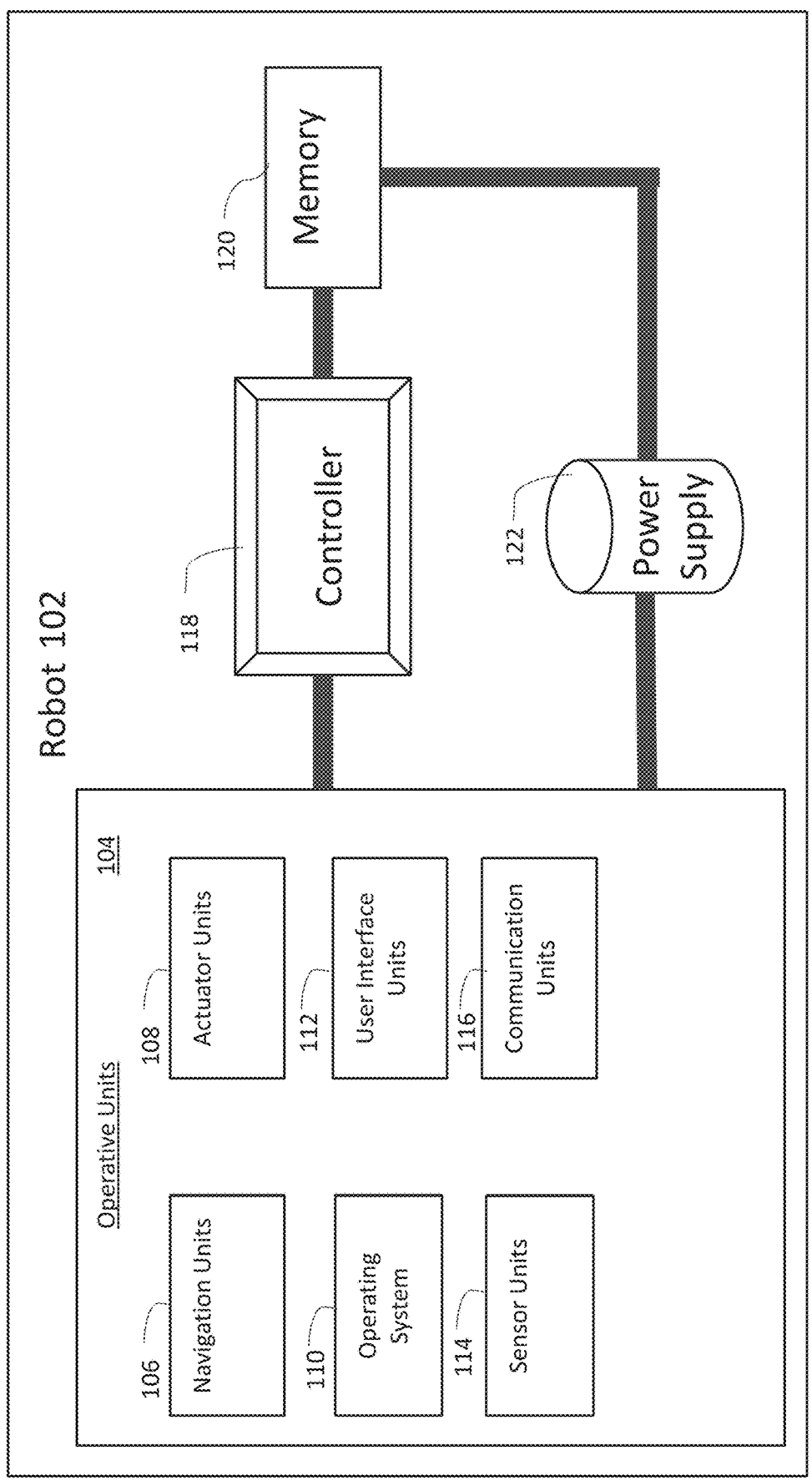
FIG. 1A is a functional block diagram of a main robot or autonomous vehicle in accordance with some embodiments of this disclosure.

All Figures disclosed herein are © Copyright 2019 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems, apparatuses, and methods for detecting and removing sunlight or equivalents thereof from image data from a sensor of a robot. One skilled in the art will appreciate that a robot, robotic system or robotic device disclosed herein pertain and are directed to an autonomous device.

According to at least one non-limiting exemplary embodiment, a method for detecting and masking noise due to high intensity broadband electromagnetic waves, such as sunlight, flashlight, floodlight, or equivalents thereof, in images received by an imaging camera of a robot is disclosed. The method may comprise determining a dynamic light intensity threshold, determining a mean intensity value of a received image, and comparing the mean intensity value of the received image with the dynamic light intensity threshold, wherein a mean intensity value exceeding the threshold may correspond to the received image comprising noise due to high intensity broadband electromagnetic waves. The method may further comprise applying a mask to a received image, the mask being applied to pixels or regions of the image comprising noise due to the high intensity broadband electromagnetic waves.

According to at least one non-limiting exemplary embodiment, a robotic system is disclosed. The robotic system may comprise a controller, a memory, and a plurality of imaging cameras coupled to the robot that are used to, and are configurable to, navigate the robot and detect obstacles along the traveled path of the robot. The robotic system may be further configurable to receive an image from the imaging cameras, determine if the received image comprises noise due to high intensity broadband electromagnetic waves based on a dynamic light intensity threshold being met or exceeded, and mask portions of the received image comprising the noise in order to prevent or not have the noise act as a false positive, and accordingly interfere with the route traveled by the robot. The robotic system may be further configurable to generate an image frame queue to determine statistics, such as a mean light intensity value, of the images within the image frame queue to be used to determine the dynamic light intensity threshold.

The example embodiments disclosed are performed by features in specific and particular configuration that make non-abstract improvements to computer technology and functionality. Some of these improvements in computer technology and functionality include executing specialized algorithm by unique and specialized processor(s) that allow the processing device to perform faster and more efficiently than conventional processor(s); and requires usage of less memory space as data is collected, analyzed and stored therein. Accordingly, the example embodiments disclosed herein are an improvement over the conventional technology or prior art directed to maneuvering a robot along a trajectory that are prone to safety risks to itself, humans and objects around it. Lastly, structural components disclosed herein, such as, for example, various sensor units, navigation units, actuator units, communication units and user interface units, are oriented in a specific manner and configuration that is unique to the functioning and operation of the robotic device as it maneuvers along a path; and the steps performed by various processors and controllers coupled to the robot disclosed herein are executed in a specific manner.

As used herein, high intensity broadband electromagnetic waves may comprise electromagnetic waves comprising both a high intensity (e.g., measured in dB, watts per square meter, etc.) and a large bandwidth. Sunlight, for example, may be considered as high intensity broadband electromagnetic waves as sunlight comprises electromagnetic waves of frequencies spanning from the ultraviolet to infrared regime and may be of high intensity (i.e., brightness). Similarly, a bright light source (e.g., fluorescent lamps) may additionally emit high intensity broadband electromagnetic waves. It is appreciated by one skilled in the art that the systems and methods of the present disclosure may be utilized to dynamically filter any high intensity broadband electromagnetic waves from image data from a sensor of a robot, wherein filtering sunlight from image data from a sensor of a robot is not intended to be limiting.

As used herein, a robot may include mechanical and/or virtual entities configurable to carry out a complex series of tasks or actions autonomously. In some exemplary embodiments, robots may be machines that are guided and/or instructed by computer programs and/or electronic circuitry. In some exemplary embodiments, robots may include electro-mechanical components that are configurable for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a robot or controller coupled to the robot utilizing an image for navigation may include the robot or controller coupled to the robot utilizing the image for localization based on nearby objects, obstacle or object detection within the image, feature extraction (e.g., for locating a target), and/or any other use of an image to the robot or controller coupled to the robot that enables the robot or controller to perform a function or maneuver.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g 802.11 a/b/g/n/ac/ad/af/ah/ai/aj/aq/ax/ay), and/or other wireless standards.

As used herein, processor, processing device, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) allow robots or autonomous vehicles to detect sunlight in an image received by an imaging camera or sensor coupled to the robot or the autonomous vehicle; (ii) specifically remove areas of an image comprising noise due to sunlight; (iii) enable robots or autonomous vehicles to navigate in more complex regions, such as regions near windows without having the sunlight interfere with the trajectory or maneuvering of the robot or autonomous vehicle; and (iv) improve the safety of operation of the robots or the autonomous vehicle as it maneuvers along a trajectory or path in a given environment. Other advantages are readily discernable by one having ordinary skill in the art given the contents of the present disclosure.

According to at least one non-limiting exemplary embodiment, a method for detecting and masking or cancelling noise due to sunlight in images received by an imaging camera coupled to a robot is disclosed. The method may comprise determining a dynamic light intensity threshold, determining a mean intensity value of a received image, and comparing the mean intensity value of the received image with the dynamic light intensity threshold, wherein a mean intensity value exceeding the threshold may correspond to the received image comprising noise due to sunlight. The method may further comprise applying a mask to a received image, the mask being applied to pixels or regions of the image comprising noise due to sunlight.

According to at least one non-limiting exemplary embodiment, a robotic system is disclosed. The robotic system may comprise a controller, a memory, and imaging cameras used to navigate the robot and detect obstacles. The robotic system may be further configurable to receive an image from the imaging cameras, determine if the received image comprises sunlight due to noise based on a dynamic light intensity threshold, and mask portions of the received image comprising noise due to sunlight. The robotic system may be further configurable to generate an image frame queue to determine statistics, such as a mean light intensity value, of the images within the image frame queue to be used to determine the dynamic light intensity threshold.

According to at least one non-limiting exemplary embodiment, a non-transitory computer readable storage medium comprising a plurality of instructions embodied thereon is disclosed. The instructions, when executed by a specialized processor or processing device, cause the specialized processing device to determine a dynamic lighting threshold based on images within an image frame queue and determine if an image received by an imaging camera comprises noise due to sunlight based on an intensity measure of the received image exceeding the dynamic lighting threshold. The instructions, when executed by the specialized processor, or the process device, may further cause the specialized processing device to apply a mask to an image comprising noise due to sunlight to eliminate the noise within the received image.

FIG. 1A is a functional block diagram of a robot 102 in accordance with some exemplary embodiments of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure, and one skilled in the art would appreciate that reference to robot 102 may equivalently pertain to an autonomous, self-operating, vehicle.

Figure 1B:
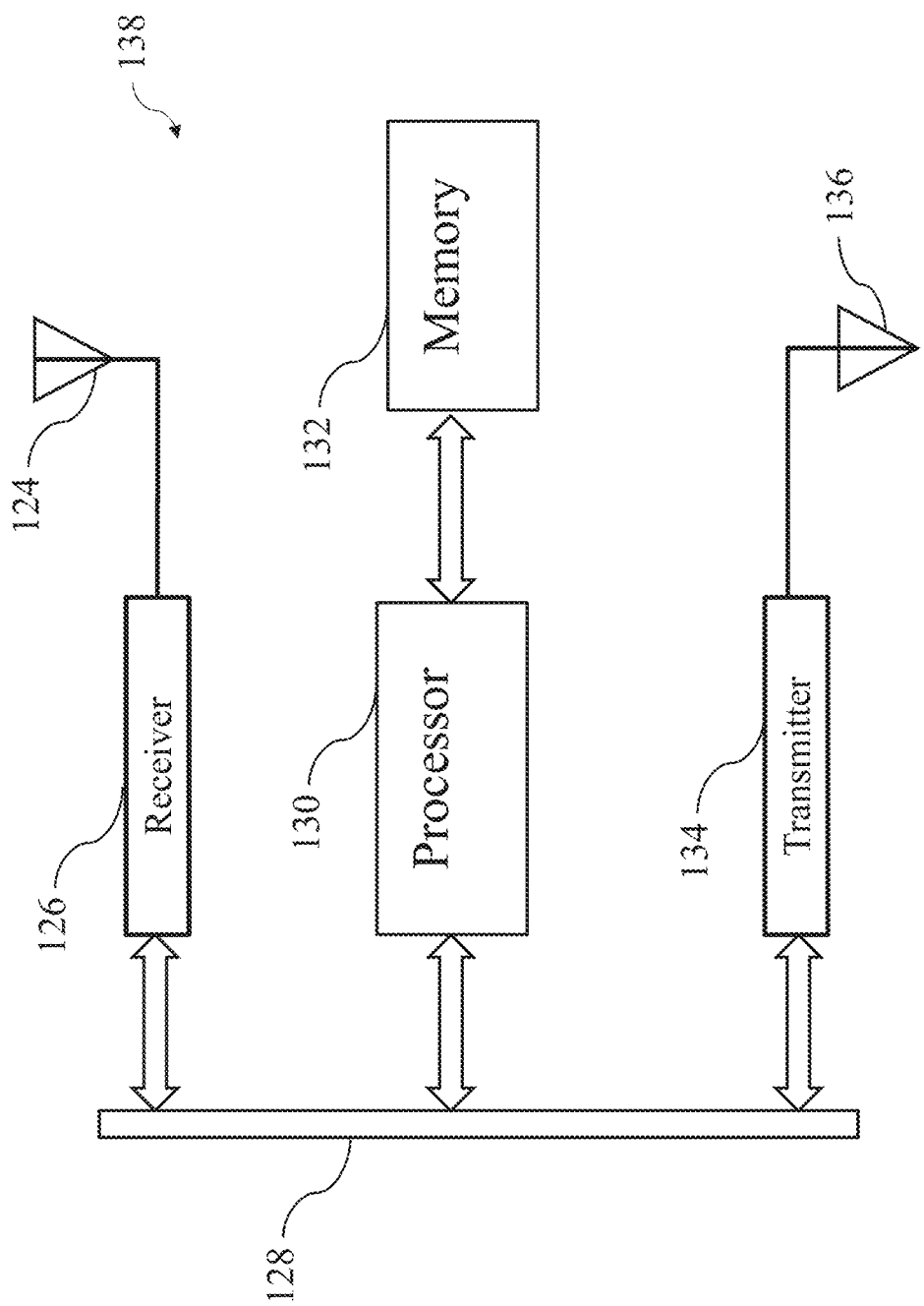
FIG. 1B is a functional block diagram of a controller, processing device or processor in accordance with some embodiments of this disclosure.

Controller 118 may control the various operations performed by robot 102. Controller 118 may include and/or comprise one or more processing devices 138, processors (e.g., microprocessors) and other peripherals as shown in FIG. 1B. As previously mentioned and used herein, processing device, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configurable to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configurable to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configurable to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configurable to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers, processing device, and/or processors. In some embodiments, a single controller (e.g., controller 118) may serve as the various controllers, processing device, and/or processors described. In other embodiments different controllers, processing device and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units that provide the various functionality of a robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configurable to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configurable to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configurable to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot's 102 position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configurable to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments, user interface units 112 may be positioned on or coupled to the body of robot 102. According to exemplary embodiments, user interface units 112 may be positioned away from the body of robot 102, but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configurable to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configurable to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configurable to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configurable to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configurable to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, processing device, or robot performing a task illustrated in the figures below comprises a controller executing computer readable instructions stored on a non-transitory computer readable storage apparatus, such as memory 120, as would be appreciated by one skilled in the art.

Next referring to FIG. 1B, the architecture of a processor 138 is illustrated according to an exemplary embodiment. As illustrated in FIG. 1B, the processor 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132, which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processor. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location. That is, the external server may also include a data bus, a receiver, a transmitter, a processor, and a memory that stores specialized computer-readable instructions thereon.

One of ordinary skill in the art would appreciate that a controller 118 of a robot 102 may include one or more processors 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processors 138 thereof executing computer-readable instructions and, in some instances, the use of any hardware peripherals known within the art. Controller 118 may be illustrative of various processors 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processors 138 for performing high-level tasks (e.g., planning a route to avoid obstacles) and processors 138 for performing low-level tasks (e.g., producing actuator signals in accordance with the instructions from a high-level processor 138).

Figure 2B:
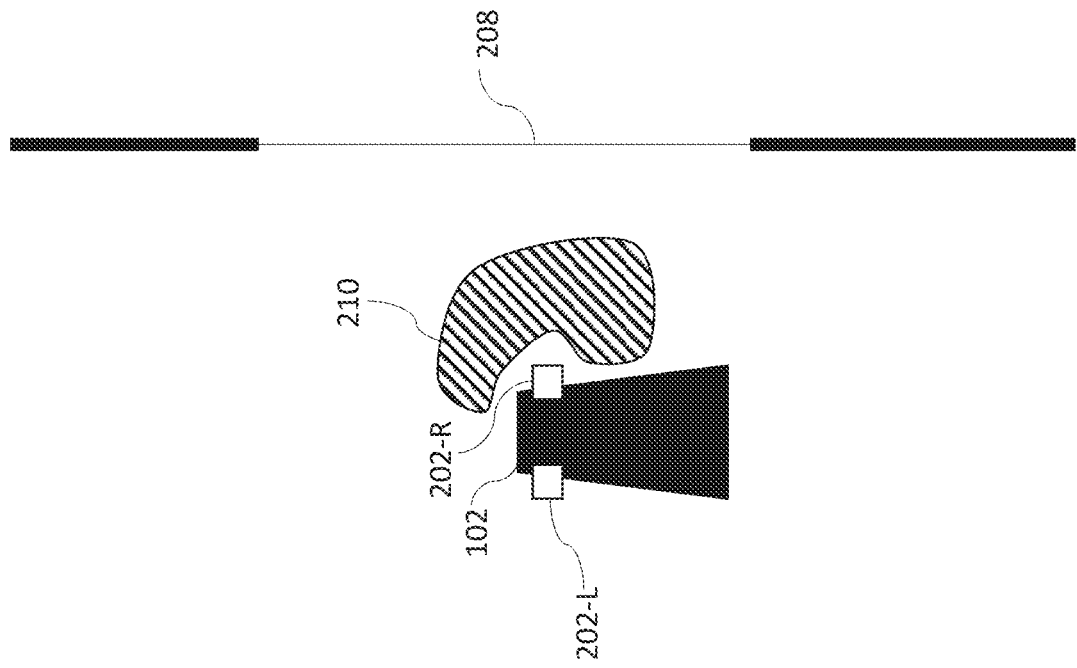
FIG. 2B illustrates a robot or autonomous vehicle, upon sunlight reaching a camera sensor of the robot, generating a false positive due to the sunlight, according to an exemplary embodiment.
Figure 2A:
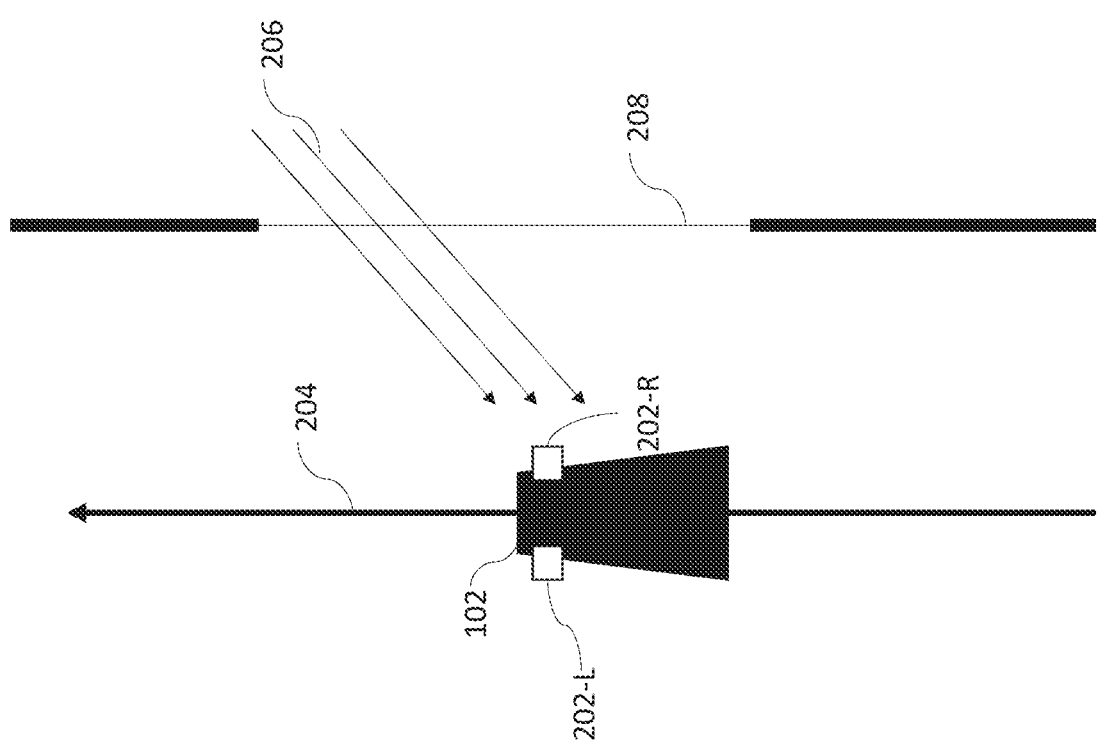
FIG. 2A illustrates a robot or autonomous vehicle navigating a route near a window causing sunlight to reach a camera sensor coupled to the robot, according to an exemplary embodiment.

FIG. 2A illustrates a robot 102 passing in front of a window 208 along a traveled route 204 where sunlight 206, comprising high intensity broadband electromagnetic waves, passes through the window 208 and reaches a right camera 202-R coupled to the robot 102, according to an exemplary embodiment. One skilled in the art would appreciate that reference to sunlight is equivalent to high intensity broadband electromagnetic waves ranging from infrared (IR) to ultraviolet rays (UV). The right camera 202-R and left camera 202-L may comprise some, none, different, or all of the features of sensor units 114 illustrated in FIG. 1A and may be configurable to capture images (e.g., red, green, blue, grayscale, etc.) of a surrounding environment of the robot 102.

The sunlight 206 reaching or being captured or detected by the right camera 202-R may cause image data generated by the right camera 202-R to become too noisy to distinguish objects or features within the image data. In some instances, the sunlight 206 may cause pixels of images from the right camera 202-R a charged coupled device (CCD) array to saturate. In some instances, the overall intensity of images produced by the right camera 202-R may be increased due to the sunlight 206, causing objects depicted by images from the camera 202-R to be of lower salience when compared to the background of the images, making the objects harder to detect. In some instances, sunlight 206 may cause detection of false positive objects, as illustrated in FIG. 2B next due to the inability to distinguish objects due to the noise from sunlight 206.

FIG. 2B illustrates a robot 102, comprising left and right cameras 202-L and 202-R, respectively, stopped in front of a window 208 due to a false positive 210 generated due to noisy image data caused by sunlight 206, illustrated above in FIG. 2A, which passes through the window 208 and reaching the right camera 202-R coupled to the robot 102, according to an exemplary embodiment. In other words, a false positive 210 is detected because the image captured either the left and right cameras 202-L, 202-R, are so bright that objects in the vicinity of the robot 102, or along the path of the robot 102, are not distinguishable with respect each other. According to at least one non-limiting exemplary embodiment, a robot 102 may determine objects based on salient features within an image generated by, for example, a right camera 202-R. Sunlight 206 reaching the right camera 202-R may cause the image data to comprise either no salient features due to the brightness of the sunlight 206 or too much noise to distinguish salient features within an image.

Due to the brightness and/or noise of the image received by the right camera 202-R, a controller 118 coupled to the robot 102 may determine a false positive 210 near the robot. That is, the robot 102 may infer detection or presence of an object or obstruction in that region of its traveled path, when one does not exist. This false positive 210 determination may be continuously detected near the robot 102 even when the robot 102 attempts to maneuver away from the false positive 210 as the false positive 210 is caused by sunlight 206, illustrated above in FIG. 2A, which may still reach the right camera 202-R as the robot 102 attempts to maneuver away. The false positive 210 may cause the robot 102 to get stuck as the controller 118 of the robot 102 may not be able to reroute the robot 102 away from the false positive 210 without a collision with the false positive 210, as the false positive 210 is associated with obstruction in the traveled path of the robot 102 which the robot 102 is programmed to avoid.

FIG. 2C illustrates a robot 102, navigating a route 204 in front of a window 208, at a subsequent later point in time after it has previously detected the false positive 210 in FIG. 2B. In navigating a route 204 in front of the window 208, a right camera 202-R coupled to the robot 202 is illuminated by sunlight 206, according to an exemplary embodiment. A controller 118 of the robot 102 may, however, determine sunlight 206 is being observed by the right camera 202-R using methods illustrated below in FIGS. 3A-C and 4. Accordingly, upon the controller 118 making the determination that the right camera 202-R is generating noisy measurements due to sunlight 206, the controller 118 may apply a mask 212 to the image data from the right camera 202-R, thereby eliminating noise due to the sunlight 206. Upon elimination of the noise caused by the sunlight 206 from the image data received by the right camera 202-R using the mask 212, the controller 118 may determine no nearby false positives 210, as illustrated above in FIG. 2B, and may continue to navigate the robot 102 along route 204 and past the region where false positive 210 was detected in FIG. 2B. Upon the robot 102 moving beyond the window 208 along the route 204, the controller 118 may determine to remove the mask 212 from the right camera 202-R. Stated differently, the mask 212 is akin to sunglasses that a user puts on when being exposed to high intensity sunlight when he or she steps from an inside environment to an outside environment. As the robot 202 is exposed to the sunlight 206 and determines that noise is being detected in the image data collected by the image sensor, the robot 202 then applies the mask 212 to filter or tune out the noise being detected by the image sensor.

According to at least one non-limiting exemplary embodiment, sunlight 206 illustrated in FIG. 2A-C above may be illustrative of high intensity broadband electromagnetic waves emitted from a different source such as, for example, a nearby fluorescent lamp. Similar to sunlight, light emitted from a nearby fluorescent lamp may be of high intensity thereby causing a false positive 210 to be generated. A robot 102 may utilize substantially similar systems and methods as disclosed herein to detect and remove noisy image data caused by any high intensity broadband electromagnetic waves.

Figure 3A:
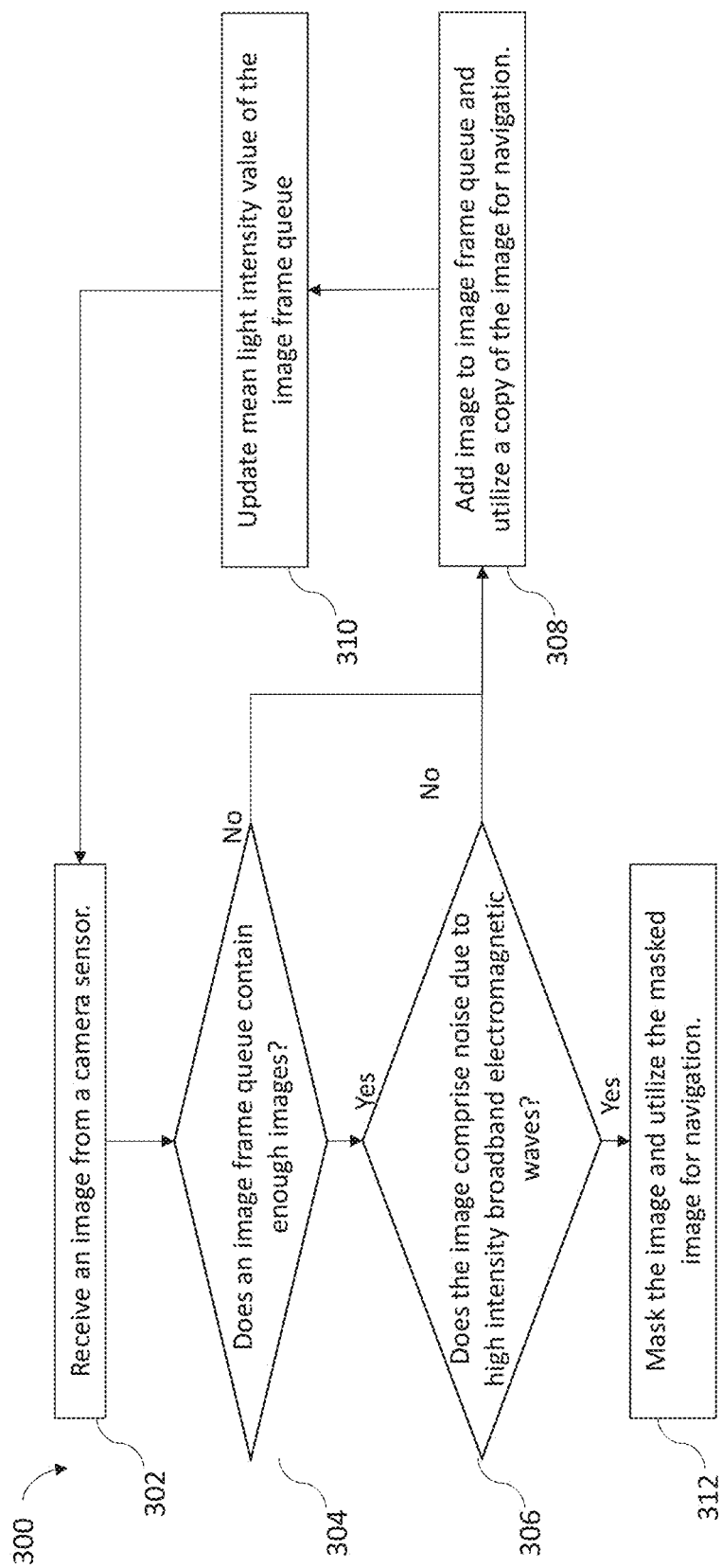
FIGS. 3A-C are process flow diagrams of methods for detecting an image from a camera sensor, wherein the image captured comprises noise due to sunlight, according to an exemplary embodiment.

FIG. 3A illustrates an exemplary method 300 for a controller 118 to manage an image frame queue, according to an exemplary embodiment. The image frame queue may comprise a plurality of images used to determine a dynamic light intensity threshold value for sunlight detection in images received by a camera sensor based on an average light intensity value of the images within the image queue.

Block 302 illustrates the controller 118 receiving an image from the camera sensor of the robot 102. The image may be, for example, a grayscale image, color image (e.g., RGB), or a frequency spectrum domain representation of an image (e.g., Fourier transformed image).

Block 304 illustrates the controller 118 determining if the image frame queue contains enough image based on a prescribed threshold, wherein the threshold may be communicated to the controller 118 via wireless or wired communication or determined by the controller 118 executing specialized algorithms stored in memory 120. The threshold requirement of the number of images of the image frame queue may be utilized to generate accurate statistics on the images within the image frame queue, wherein the statistics may comprise a mean light intensity value to be used in determining a dynamic lighting intensity threshold to detect high intensity broadband electromagnetic waves within images exceeding the dynamic lighting intensity threshold which may generate noise and false positives. For example, a controller 118 may utilize 10, 100, 200, etc. images within an image frame queue to determine an accurate mean intensity value, wherein the accuracy of the mean intensity value may depend on the number of images stored within the image frame queue. It will be appreciated by one skilled in the art that the number of images within an image frame queue may depend on, including but not limited to, a frame capture rate of an image sensor, computational power of a controller 118, and desired accuracy of the mean light intensity value. As such, the dynamic lighting intensity threshold may be adjusted in real-time based on mean light intensity value in order to take into account the additional images that are captured in real time by the sensors coupled to the robot as it travels along a route or trajectory. Accordingly, the dynamic lighting intensity threshold is not a static, pre-programmed, or pre-computed value or measure. Instead, it is a changing value that is configurable to adapt or adjust, up or down in value or measure, as additional data sets of images captured by the sensors are obtained.

According to at least one non-limiting exemplary embodiment, the controller 118 may further determine if the captured image comprises noise due to high intensity broadband electromagnetic waves prior to adding the image to the image frame queue using a method illustrated below in block 306. If the captured image comprises noise due to high intensity broadband electromagnetic waves (e.g., based on a mean light intensity threshold), the controller 118 may determine not to add the image to the image frame queue. That is, the capture image may be added to the image frame queue only if it comprises noise due to high intensity broadband electromagnetic waves.

According to at least one non-limiting exemplary embodiment, the controller 118 may capture and place a plurality of images into the image frame queue upon initialization of a robot 102 comprising the controller 118. According to at least one non-limiting exemplary embodiment, the image frame queue may comprise light intensity measurements across a frequency spectrum of images received by a camera sensor, wherein the light intensity measurements may be utilized in determining the mean light intensity value.

Upon the controller 118 determining the image frame queue comprises enough images, the controller 118 moves to block 306. The number of images within the image frame queue may be a fixed threshold number (e.g., 10, 50, 100, etc.) such that accurate measurement of the mean intensity value can be determined. In some embodiments, the value of the threshold number may depend on the frame rate of the camera sensor and speed of the controller 118.

Block 306 illustrates the controller 118 determining whether the received image from the camera sensor comprises noise due to high intensity broadband electromagnetic waves, such as sunlight or equivalent thereof. The controller 118 may make this determination, using a method illustrated below in FIG. 3B, discussed below, based on a dynamic light intensity threshold being met or exceeded. The dynamic light intensity threshold being determined based on the mean light intensity value of the images within the image frame queue. In other words, the dynamic light intensity threshold comprises of a changing number, or numerical, value that may be adjusted up or down by the controller 118 based on the mean light intensity value of the images within the image frame queue, which varies with time as the robot 102 travels along a route, captures images using the camera sensor, and the ambient light intensity changes (e.g., during sunrise, sunset, etc.).

Upon the controller 118 determining that the received image comprises noise due to high intensity broadband electromagnetic waves, the controller 118 moves to block 312. Block 312 illustrates the controller 118 applying a mask (i.e., blocking or removing a portion of the image) to the received image to remove the noise due to the high intensity broadband electromagnetic waves. The masking process is further illustrated below with respect to block 346 in FIG. 3C and FIG. 5A-C. The masked image may then be utilized by the controller 118 for navigation of the robot 102. One of ordinary skill in the art may appreciate that application of a mask may correspond to an application of a filter to the image in order to filter, remove or distill noisy regions in the image.

Alternatively, upon the controller 118 determining the received image comprises no noise due to high intensity broadband electromagnetic waves, the controller 118 moves to block 308 from block 306 instead of moving to block 312 as discussed above.

Block 308 illustrates the controller 118 adding the received image to the image frame queue. The received image may have been added to the queue based on the determination in block 304 or 306. The image frame queue may comprise a first in first out (FIFO) queue system, as further illustrated below in FIG. 6, wherein, upon adding a new image to the image frame queue (e.g., captured by a sensor of the robot 102 during operation), the mean or average light intensity value of the images within the image frame queue changes based on a mean light intensity of the new image and previous images. Thereby, updating the dynamic light intensity threshold. One skilled in the art would appreciate that the "change" or delta in the mean light intensity value is based on a sum of mean intensity values of each of the plurality of images in an image frame queue and the newly added image to the image frame queue. In calculating the "mean value" of the images, each image in the image frame queue is given or designated a light intensity value, which is a numerical value based on average intensity of some or all pixels within the image. Accordingly, as a new image with a different light intensity value is added, the mean value of the images within the image fame queue changes or is updated. Lastly, when referring to "image frame queue", one skilled in the art would appreciate it to refer to a temporary buffer, which cycles images in and out as the robot 102 operates and generates new images. Upon calculating the mean light intensity of a respective image, the image can be later ignored or discarded by image frame queue.

According to at least one non-limiting exemplary embodiment, a mean light intensity value of an image may be passed to an image frame queue, depicted in FIG. 6 below, wherein the image frame queue may comprise a plurality of numerical values of mean light intensity of the received images stored in memory 120 of the robot 102. That is, the image frame queue may instead comprise a series of numerical values rather than two dimensional images such that image frame queue may be used to determine mean intensity based on intensity of each image in the image frame queue.

Block 310 illustrates the controller 118 updating a mean light intensity value of the image frame queue upon the image frame queue receiving a new image in block 308 (e.g., the received image added to the image frame queue from block 308). This updated mean light intensity value may be utilized in the determination of a dynamic light intensity threshold to be used in detection of noise due to sunlight in the next received image as the robot 102 travels along a trajectory.

Advantageously, the use of an image frame queue may enhance the ability of the controller 118 to determine an appropriate light intensity threshold for each image arriving from the camera sensor (e.g., dynamic light intensity threshold) coupled to the robot 102 in real-time as the robot 102 travels along a trajectory. Adjusting the light intensity threshold in real time by changing the mean light intensity value of the images within the image frame queue may additionally enable a robot 102 to navigate to rooms or regions of varying brightness without generating a false positive of high intensity broadband electromagnetic wave detection within images from imaging cameras. Thereby, avoiding masking portions of images, which do not require masking.

Figure 3B:
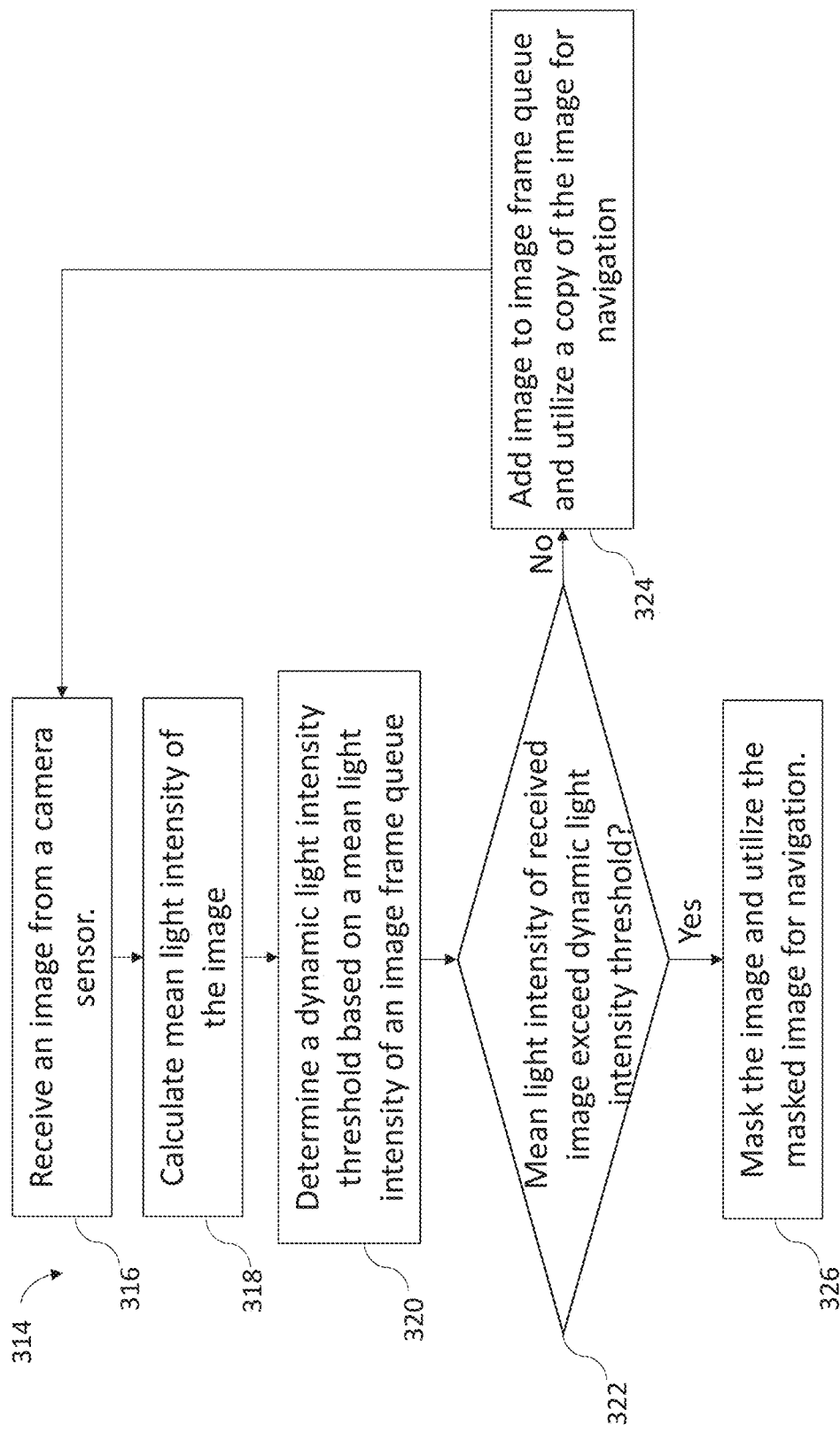

FIG. 3B illustrates a method 314 for a controller 118 of a robot 102 to determine if an image received from a camera sensor comprises noise due to high intensity broadband electromagnetic waves, according to an exemplary embodiment.

Block 316 illustrates the controller 118 receiving an image from the camera sensor coupled to the robot 102. The image may be, for example, a grayscale image, color image (e.g., red, green, blue), or a frequency spectrum domain representation of an image (e.g., Fourier transformed image).

Block 318 illustrates the controller 118 calculating a mean light intensity of the received image. The controller 118 may calculate the mean light intensity value based on, for example, a mean value of light intensity measure across a frequency spectra representation of the received image. The mean light intensity value of the image may be a single value across the entire frequency spectra or may comprise different intensity values across the frequency spectrum of the image, as illustrated below in FIG. 4 with respect to threshold 404 (e.g., threshold 404 may not be a straight line across the frequency spectrum).

Block 320 illustrates the controller 118 determining a dynamic light intensity threshold based on a mean light intensity value of an image frame queue. The mean light intensity value of the image frame queue may be calculated based on the light intensity of the images within the image frame queue, as illustrated above in FIG. 3A and below in FIG. 6. The dynamic light intensity threshold may vary, or get updated or adjusted, in real-time, as new images are inputted into the image frame queue in a continuous basis as the robot 102 travels along a trajectory. Thereby, changing the mean light intensity value of the image frame queue. Advantageously, this may eliminate false positives for high intensity broadband electromagnetic wave detection within the image as the robot 102 moves from rooms of varying light levels. According to at least one non-limiting exemplary embodiment, the mean light intensity value calculation may additionally include a mean light intensity value of the received image. Stated differently, by capturing plurality of images continuously and in real-time, as the robot 102 travels along a trajectory, the inventory of the image frame queue increases with these plurality of captured images, wherein each of the captured images having a respective mean light intensity value.

Block 322 illustrates the controller 118 comparing the mean light intensity value of the image and the dynamic light intensity threshold determined in block 320. If the mean light intensity of the image exceeds the dynamic light intensity threshold, the image may be determined to comprise noise due to high intensity broadband electromagnetic waves.

Upon the controller 118 determining the mean intensity of the image does not exceed the dynamic light intensity threshold, the controller 118 moves to block 324. Block 324 illustrates the controller 118 adding the image, determined not to comprise of noise due to high intensity broadband electromagnetic waves in block 322, to the image frame queue. Additionally, a copy of the image may be used by the controller 118 for navigation or operation of the robot 102. According to at least one non-limiting exemplary embodiment, a numerical value of the mean light intensity value of an image may be passed to an image frame queue, wherein the image frame queue may comprise a plurality of mean light intensity values of received images.

Alternatively, upon the controller 118 determining that the mean intensity of the image does exceed the dynamic light intensity threshold, the controller 118 moves to block 326 to apply a mask to the image. The process of applying the mask to the image is described further in block 346 of FIG. 3C and FIG. 5A-C.

Figure 3C:
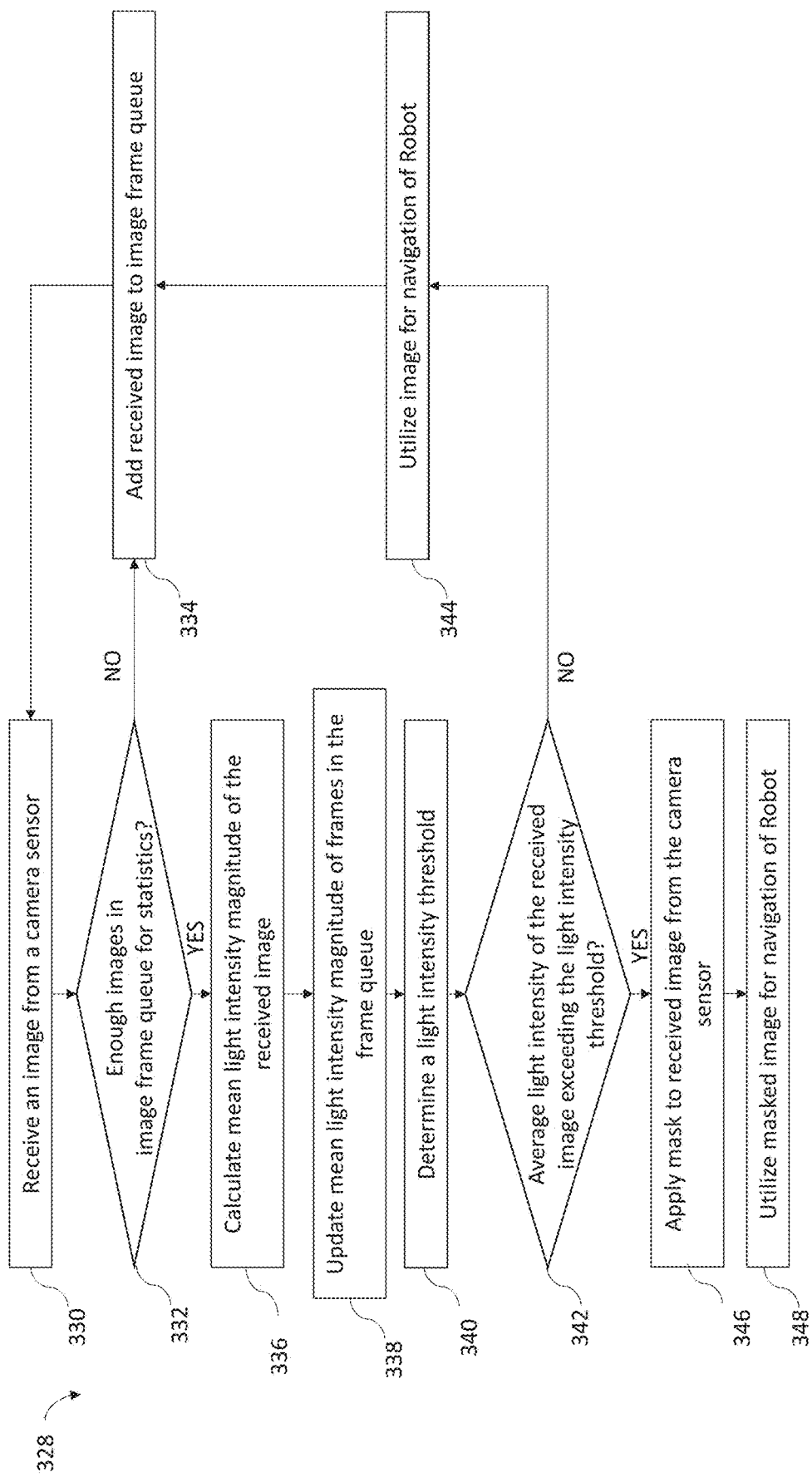

The two process flow diagrams illustrated above in FIGS. 3A-B may be further expanded upon in FIG. 3C to illustrate a method 328 for a controller 118 to determine if an image received from a camera sensor coupled to a robot 102 comprises noise due to, for example, sunlight, flashlight, or floodlights, based on statistics of an image frame queue, as illustrated above in FIGS. 3A-B, and apply a mask to the image if it is determined that the image comprises noise due to sunlight. One skilled in the art would appreciate that method 328 may be utilized by a controller 118 to determine and filter any high intensity broadband electromagnetic waves from image data from a camera sensor, wherein the detection and removal of sunlight is not intended to be limiting.

Block 330 illustrates the controller 118 receiving an image from the camera sensor of the robot 102. The image may be, for example, a grayscale image, color image (e.g., RGB), or a frequency spectrum domain representation of an image (e.g., Fourier transformed image).

Block 332 illustrates the controller 118 determining if an image frame queue comprises enough images to determine statistics of a plurality of images within the image frame queue. The controller 118 may make this determination based on a threshold number of images within the image frame queue required for the controller 118 to determine statistics from the images. The threshold number of images may be communicated to a robot 102 by a user using a user interface unit 112, communicated wirelessly (e.g., from an external server or network), via wired communications using communication units 116, or determined by the controller 118 of the robot 102. The statistics may include a mean light intensity value of the light intensity of the images within the image frame queue, wherein the threshold number of images in the image frame queue may be determined to generate an accurate mean value of light intensity of multiple images.

Upon the controller 118 determining not enough images are present within the image frame queue, the controller 118 moves to block 334. Block 334 illustrates the controller 118 adding the received image to the image frame queue. The image frame queue may comprise a plurality of image frames received by the camera sensor, as illustrated below in FIG. 6. The image frame queue may be a queue of images to be processed by the controller 118 or may be a separate image frame queue used for generating statistics of the images not comprising sunlight noise, or other noise created by something equivalent, for example, flashlight or floodlight noise.

Alternatively, upon the controller 118 determining enough images are present within the image frame queue, the controller 118 moves to block 336. Block 336 illustrates the controller 118 calculating a mean light intensity magnitude of the received image. The controller 118 may use, for example, a root-mean square (RMS) calculation, or similar mean calculation, across the frequency spectra of the received image to determine the mean light intensity magnitude of the received image. According to at least one non-limiting exemplary embodiment, the mean light intensity magnitude of the received image may vary across the frequency spectra, wherein the magnitude of the mean light intensity magnitude calculated may comprise different light intensity values at different frequencies, as illustrated below in FIG. 4 with respect to a mean light intensity magnitude 408 of an image reading 406 being curved.

According to at least one non-limiting exemplary embodiment, the loop between blocks 330, 332, and 334 may be performed during initialization of the robot 102, wherein the robot 102 may capture images and fill the image frame queue prior to navigating a surrounding environment.

Next, block 338 illustrates the controller 118 updating the mean light intensity magnitude of the image frame queue based on the images within the image frame queue. According to at least one non-limiting exemplary embodiment, the mean light intensity magnitude calculation may further include the mean light intensity magnitude of the received image calculated above in block 308. This updated mean light intensity magnitude may be utilized by the controller 118 to determine a light intensity threshold value illustrated below in block 340.

Block 340 illustrates the controller 118 determining the light intensity threshold value based on the updated mean light intensity magnitude of the image frame queue calculated above in block 338. The light intensity threshold value may be utilized by the controller 118 to determine if the received image comprises sunlight noise, or equivalent thereof. The light intensity threshold value, as illustrated in method 314, may be updated for every image added to the image frame queue or every received image from the camera sensor, thereby making the light intensity threshold value a dynamic threshold. Advantageously, the use of a dynamic threshold may enhance the ability of the robot 102 to navigate from low light intensity environments (e.g., hallways or windowless rooms) to high light intensity environments (e.g., in well-lit rooms) without generating a false positive with respect to sunlight detection in the received image due to the dynamic lighting threshold increasing as the robot 102 moves from the low light intensity environment to the high light intensity environment.

Block 342 illustrates the controller 118 determining if the average light intensity magnitude of the received image calculated in block 336 exceeds the threshold value determined in block 340. A received image light intensity magnitude exceeding the threshold may be determined to comprise noise due to sunlight in at least a portion of the image.

Upon the controller 118 determining the average light intensity magnitude does not exceed the light intensity threshold, the controller moves to block 344. Block 344 illustrates the controller 118 utilizing the received image for navigation of the robot 102. Navigation of the robot 102 may include feature extraction, localization, object detection, and/or any other function of the robot 102 wherein the received image, determined to not comprise noise due to sunlight, may be of use to the robot 102 to perform the operations. A copy of the image may then be sent to the image frame queue to be used to update the statistics of the image frame queue to determine a dynamic light intensity threshold for the next received image, as shown in block 334.

Alternatively, upon the controller 118 determining the average light intensity magnitude exceeds the light intensity threshold, the controller moves to block 346. Block 346 illustrates the controller 118 applying a mask to the received image from the camera sensor. The mask may comprise a pixel-wise determination of pixels comprising high intensity noise based on the dynamic light intensity threshold, wherein the determined pixels of high intensity noise may be masked to eliminate the noise. This may reduce the field of view of the robot 102 with respect to the received image, however the mask may drastically reduce detection of false positives caused by sunlight noise. The drastic reduction in detection of false positives 210 due to sunlight may enhance the ability of the robot 102 to navigate in environments comprising sunlight without getting stuck, as illustrated above in FIG. 2B-C. The mask used and methods of imposing the mask to remove sunlight noise from the received image are further illustrated below in FIG. 5.

Block 348 illustrates the controller 118 utilizing the masked image for navigation of the robot 102. Navigation of the robot 102 may include feature extraction, localization, object detection, and/or any other function of the robot 102 wherein masked image may be of use to the robot 102 to perform the operations.

Figure 4:
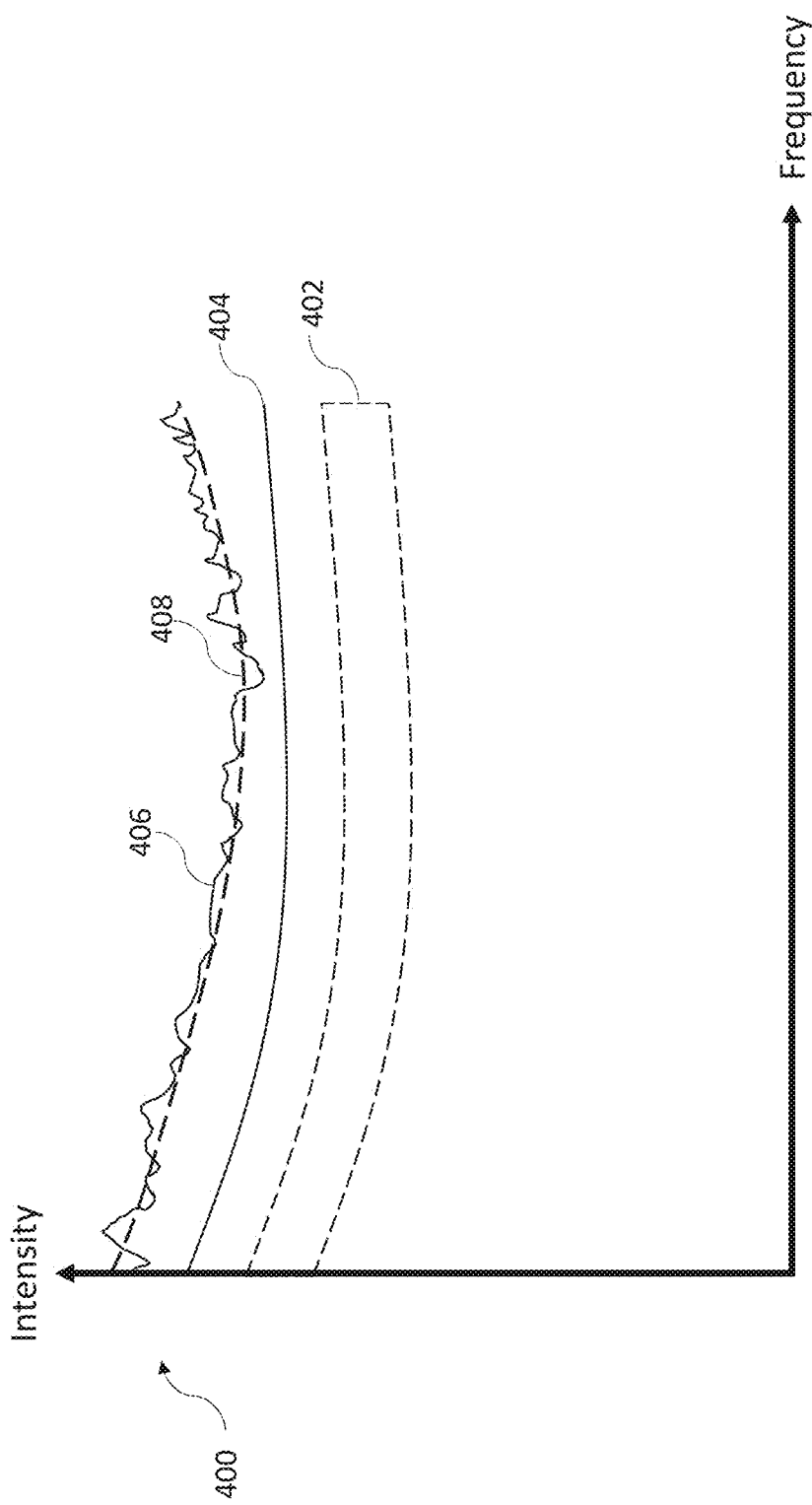
FIG. 4 illustrates a light intensity graph comprising a normal measurement range, a dynamic intensity threshold, and a measurement exceeding the threshold, according to an exemplary embodiment.

FIG. 4 illustrates an intensity measure versus frequency graph 400 comprising a normal intensity reading range 402 of images from an imaging camera, a dynamic light intensity threshold 404, and a measurement 406 exceeding the light intensity threshold 404, according to an exemplary embodiment. As used herein, with respect to FIG. 4, intensity (e.g., vertical axis) may correspond to light intensity (e.g., luminosity or brightness) measured in, for example, decibels. The frequency axis (i.e., horizontal axis) may correspond to frequency of electromagnetic waves or a pixel of the image (e.g., Fourier representation of the image) with an intensity value, wherein the zero (i.e., far left of the horizontal axis) may or may not be of value zero. The normal intensity reading range 402 may be determined by a controller 118 based on an intensity measure of images within an image frame queue, wherein the intensity range of the normal intensity reading range 402 (e.g., the height of the normal intensity reading range 402) may be determined based on a mean intensity measure of a plurality of images within the frame queue and a standard deviation measure of the intensity measures of the images within the image frame queue across the frequency spectrum. In other words, the intensity range (e.g., height) of the normal intensity reading range 402 may be centered about the mean intensity value of the images within the image frame queue and the intensity range may be based on a standard deviation of intensity values of the individual images within the image frame queue.

The graph 400 further comprises a dynamic light intensity threshold 404, wherein a mean intensity measurement of a received image exceeding the threshold may correspond to the image comprising noise due to high intensity broadband electromagnetic waves, such as sunlight, or equivalent thereof. The dynamic light intensity threshold 404 may be determined based on a plurality of parameters represented by images within an image frame queue including, but not limited to, environmental lighting parameters (e.g., dimly lit or brightly lit rooms), the intensity range of the normal intensity reading range 402 (e.g., to account for large variance in lighting between images within the image frame queue), and/or safety parameters (e.g., a robot 102 may not operate safely if the intensity measure is of a certain value determined by the intensity threshold 404). The dynamic light intensity threshold 404 may be recalculated, as illustrated above in FIG. 3, when a new image is added to the image frame queue.

Measurement 406 may comprise an intensity versus frequency measure of an image received by an imaging camera. The measurement 406 may be determined by a controller 118 executing specialized algorithms stored in memory 120 such as, for example, Fourier transforms. As illustrated, measurement 406, and corresponding mean value 408 illustrated by a dashed line, lies above the intensity threshold 404, wherein the controller 118 may determine that the image generating the measurement 406 may comprise noise due to high intensity broadband electromagnetic waves. Accordingly, the controller 118 may apply a mask to the received image to reduce or eliminate the noise, as illustrated below in FIG. 5.

According to at least one non-limiting exemplary embodiment, some portions of measurement 406 may lie above threshold 404 and some portions of the measurement 406 may lie below the threshold 404 which may correspond to a portion of the image comprising noise due to high intensity broadband electromagnetic waves and another portion which does not comprise this noise, as illustrated below in FIG. 5B.

Figure 5C:
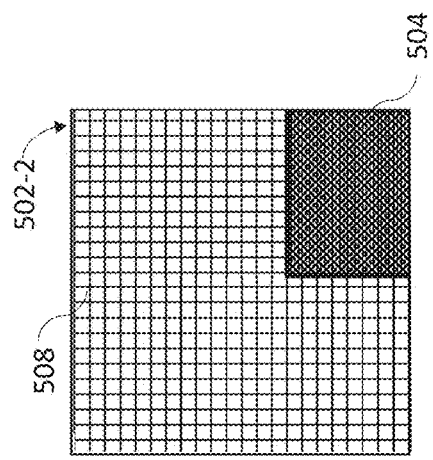
FIGS. 5A-C illustrates a method for masking an image comprising noise due to sunlight, according to an exemplary embodiment.

Next, FIGS. 5A-5C will be discussed in detail. FIG. 5A illustrates an image frame 502-1 comprising a region 504 with no noise due to high intensity broadband electromagnetic waves, according to an exemplary embodiment. As illustrated, the region of no noise due to sunlight 504 comprises the entire image frame 502-1. Image frame 502-1 may be taken by an imaging camera, of sensor units 114 illustrated above in FIG. 1A, at a location where no high intensity broadband electromagnetic waves reaches the imaging camera. A controller 118 of a robot 102 comprising the imaging camera, which produced the image frame 502-1 may determine the image frame 502-1 comprises no noise due to high intensity broadband electromagnetic waves and may therefore add the image to an image frame queue.

Figure 5B:
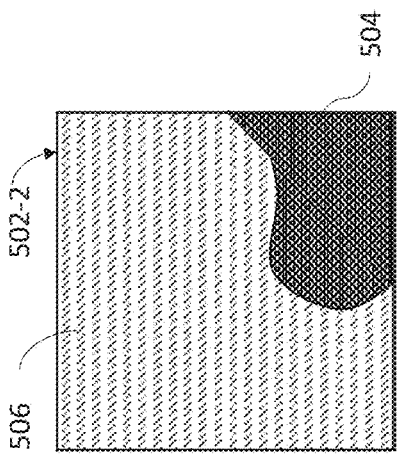
Figure 5A:
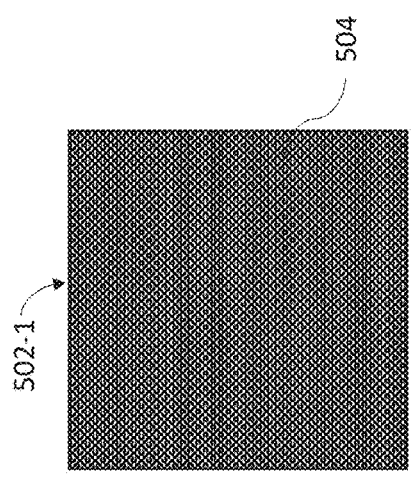

FIG. 5B illustrates an image frame 502-2 comprising a region 504 of no noise due to high intensity broadband electromagnetic waves and a region 506 comprising noise due to high intensity broadband electromagnetic waves, according to an exemplary embodiment. The two regions 504, 506 may comprise of different noise levels due to, for example, sunlight being incident on a portion of a camera sensor used to capture the image frame 502-2. The region comprising noise 506 due to sunlight, or equivalent thereof, may be of high light intensity, thereby causing the mean light intensity value of the image frame 502-2 to exceed a dynamic intensity threshold 404 at the pixels within region 506. Upon the controller 118 determining the region 506 based on a mean light intensity value of the pixels within region 506 exceeding the dynamic light intensity threshold 404, the controller 118 may determine that the image frame 502-2 comprises regions of noise due to high intensity broadband electromagnetic waves. Accordingly, the controller 118 may then utilize a mask 508 to remove the region 506 as illustrated in FIG. 5C.

Next, FIG. 5C comprises the image frame 502-2, previously illustrated in FIG. 5B, with a pixel mask 508 applied to the regions comprising noise due to sunlight 506, according to an exemplary embodiment. The controller 118 may utilize a pixel wise method of determining which pixels comprise high light intensity or high intensity noise and apply the mask 508 to the pixels of high light intensity or noise values. As illustrated, upon the mask 508 being applied to the image frame 502-2, the image frame 502-2 may comprise a region of no noise due to sunlight 504. The remaining region of no noise due to sunlight 504 after the mask 508 is applied may comprise any number of pixels greater than or equal zero, up to the total number of pixels of the image frame 502-2.

Advantageously, the use of a pixel mask 508 on an image frame 502-2 comprising regions comprising noise due to sunlight 506 may enable a robot 102 to utilize at least a portion of the image frame 502-2, thereby enhancing the ability of a controller 118 of the robot 102 to effectuate the movements of the robot 102 at locations comprising sunlight (e.g., near windows). The controller 118 may utilize the remaining unmasked portion of the image frame 502-2 to detect obstacles and/or objects, localize the robot 102 based on the features of the remaining unmasked portion, and/or any other use for an image received by a camera sensor while simultaneously masking regions comprising noise due to sunlight 506 which may generate false positives 210, which, in-turn, may cause the robot 102 to get stuck, as illustrated above in FIG. 2B.

Figure 6:
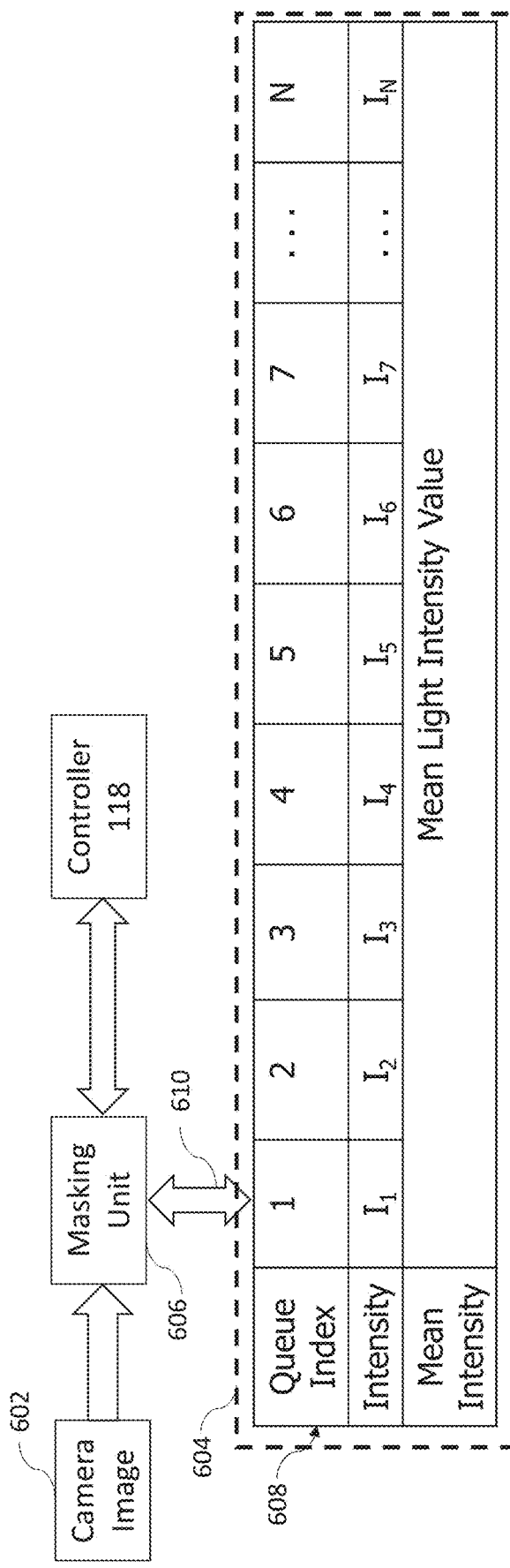
FIG. 6 illustrates a system configurable to determine if a received camera image comprises noise due to sunlight and mask pixels of the image comprising noise due to sunlight, according to an exemplary embodiment.

FIG. 6 illustrates a functional block diagram of a system configurable to determine if a camera image 602, taken by a camera sensor of a robot 102, comprises noise due to high intensity broadband electromagnetic waves, such as sunlight, and further configurable to mask the camera image 602 using a masking unit 608 if the camera image 602 comprises noise due to sunlight, according to an exemplary embodiment. Camera image 602 may comprise, for example, an RGB image, grayscale image, or a frequency spectra representation of an image. The camera image 602 may be sent to the masking unit 608 for determination of sunlight noise within the camera image 602.

Masking unit 606 may comprise an operative unit configurable to determine if a received camera image 602 comprises noise due to high intensity broadband electromagnetic waves. The masking unit 606 may be further configurable to apply a mask to regions of the camera image 602 comprising noise due to high intensity broadband electromagnetic waves. The masking unit 606 may be a separate operative unit or may be illustrative of a controller 118 of a robot 102 executing specialized algorithms stored in a memory 120, as illustrated above in FIG. 1A, to perform the functions of the masking unit 606. The masking unit 606 may be further configurable to communicate with an image frame queuing unit 604, illustrated by a dashed line around an image frame queue 608, via a connection 610.

The image frame queuing unit 604 may be configurable to receive an image from the masking unit, comprising no noise due to high intensity broadband electromagnetic waves, to be placed in an image frame queue 608. The image frame queuing unit 604 may be further configurable to determine intensity values of individual images within the image frame queue 608. The image frame queuing unit 604 may be further configurable to calculate a mean intensity value of all of the images within the image frame queue 608 used to determine a dynamic light intensity threshold 404. Both the individual intensity values of the individual images and the mean intensity value of all of the images may be a static value across a frequency spectrum of the image(s) or may be a dynamic value across a frequency spectrum of the image(s) (e.g., may comprise different intensity values at different frequencies).

The image frame queuing unit 604 may be a separate operative unit or may be illustrative of the controller 118 of the robot 102 executing specialized algorithms stored in the memory 120 to perform the functions of the frame queuing unit 604. Similarly, the image frame queue 608 may be illustrative of an image frame queue and corresponding values stored in memory 120. Each intensity value, $I_n$, may correspond to a mean intensity value across a bandwidth, wherein the bandwidth is the bandwidth of the imaging camera or image and the index n may correspond to any non-zero integer number less than the total number of images within the frame queue 608, N. The image frame queue 608 may be a first in first out (FIFO) queue of length N, index N being any non-zero integer number corresponding to the length of the queue, wherein, upon the image frame queue 608 comprising N image frames, the $N^{th}$ image frame is removed to make room for an arriving image frame upon a new image being captured by the camera sensor. For example, if N=10, then there are 10 images in the frame queue. Upon receiving another image, i.e., the $11^{th}$ image, the $10^{th}$ image is removed and the new incoming image is added. As such, the mean value of only 10 images, for example, in the queue is being computed at a time, and use of prior images is not being taken into account (e.g., when the robot was under different lighting conditions). The image frame queueing unit 604 may communicate the calculated mean intensity value to the masking unit 606 via the connection 610 to enable the masking unit 606 to determine a dynamic light intensity threshold for the arriving camera image 602. Advantageously, use of a fixed length image frame queue 608 to determine a mean light intensity value may enable the mean light intensity value to better represent the current lighting conditions of the robot 102 by only considering recently captured images.

It is appreciated by one skilled in the art that the exemplary data table of the image frame queue 608 illustrated in FIG. 6 may be a self-referential data table wherein additional rows and/or columns may be added as the controller 118 executes computer readable instructions from memory 120. Being self-referential data table allows data in the table to self-relate or reference itself. That is data stored in row, column may reference or relate to $row_x$, $column_x$, wherein "i" and "x" are positive, real integers.

The masking unit 606 may, upon receiving a mean intensity value, determine if a mean light intensity measure the camera image 602 received exceeds the dynamic light intensity threshold 404 determined based on the mean intensity value of the images of the image frame queue 608. The masking unit 606 may apply a mask, using methods illustrated above in FIG. 5, to the camera image 602 prior to passing the camera image 602 to the controller 118 if the mean light intensity value of the camera image 602 exceeds the dynamic light intensity threshold 404. The masking unit 606 may determine not to apply a mask to the image captured by the camera sensor if the mean intensity measure of the entire camera image 602, or a portion thereof, does not exceed the dynamic intensity threshold (e.g., the camera image 602 does not comprise noise due to sunlight), wherein the masking unit 606 may pass the unmasked camera image 602 to the controller 118, and send a copy of the camera image 602 to the image frame queueing unit 604 to be placed in the first position of the image frame queue 608. The image frame queueing unit 604 may update the mean light intensity value of the image frame queue 608 upon receiving a new image to the image frame queue 608 to update the dynamic light intensity threshold for the next received camera image 602. According to at least one non-limiting exemplary embodiment, masking unit 606 may determine and pass an intensity measure of a camera image 602 to the image frame queuing unit 604 if the intensity measure of the camera image 602 does not meet the dynamic intensity threshold. The controller 118 may, upon receiving a camera image 602 from the masking unit 606 (masked or unmasked), utilize the received camera image 602 to, for example, detect nearby obstacles.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology, when describing certain features or aspects of the disclosure, should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes, but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A robotic system for traveling along a trajectory, comprising:
   a memory having computer readable instructions stored thereon; and
   at least one processor device configurable to execute the computer readable instructions to,
   obtain at least one image captured by a sensor coupled to the robotic system at a first time instance at a first location of a route traveled by the robotic system;
   detect at least one region of pixels within the respective at least one image comprising a mean intensity value exceeding a dynamic lighting intensity threshold;
   apply at least one mask to the at least one region such that a false positive is not detected as the robotic system travels the route at the first location at a subsequent second time instance; and
   maneuver the robotic system past the first location with an application of the at least one mask such that the false positive is no longer detected at the first location.

2. The robotic system of claim 1, wherein the at least one processor device is configurable to execute the computer readable instructions to add the at least one image to an image frame queue such that the image frame queue comprises a plurality of images.

3. The robotic system of claim 1, wherein the dynamic light intensity threshold is based on a mean light intensity value of a plurality of images captured by the sensor in real-time, the plurality of images are present in an image frame queue, the mean light intensity value is configurable to adjust in real-time as additional images are captured by the sensor as the robotic system travels the route, adjusting of the mean light intensity value corresponds to adjusting of the dynamic light intensity threshold.

4. The robotic system of claim 1, wherein the at least one processor device is configurable to execute the computer readable instructions to store the at least one image in an image frame queue without applying the at least one mask if the mean light intensity value does not exceed the dynamic lighting intensity threshold.

5. The robotic system of claim 1, wherein,
   the at least one mask comprises a pixel-wise determination of the false positive based on the dynamic light intensity threshold, the false positive comprising of a plurality of pixels, and
   the determined plurality of pixels of the false positive are masked to eliminate the false positive from the at least one image.

6. The robotic system of claim 1, wherein the at least one processing device is coupled to an image frame queuing unit, the image frame queuing unit configurable to determine intensity values of respective images of the plurality of images within an image frame queue.

7. The robotic system of claim 6, wherein the image frame queuing unit comprises a respective intensity value corresponding to a respective image of the plurality of images stored in the image frame queue.

8. The robotic system of claim 7, wherein the image frame queuing unit comprises the mean intensity value that is an average of the respective intensity value corresponding to the respective image of the plurality of images.

9. The robotic system of claim 1, wherein the at least one processing device is configurable to execute the computer readable instructions to remove the at least one mask after the robotic system travels past the first location.

10. The robotic system of claim 1, wherein the false positive detected is a representation of high intensity broadband electromagnetic waves captured by the at least one sensor.

11. A method for traveling along a trajectory by a robot, comprising:
   at obtaining at least one image captured by a sensor coupled to the robotic system at a first time instance at a first location of a route traveled by the robot;
   detecting at least one region of pixels within the respective at least one image comprising a mean intensity value exceeding a dynamic lighting intensity threshold;
   applying at least one mask to the at least one region such that a false positive is not detected as the robot travels the route at the first location at a subsequent second time instance; and
   maneuvering the robot past the first location with the at least one mask such that the false positive is no longer detected at the first location.

12. The method of claim 11, further comprising:
   adding the at least one image to an image frame queue such that the image frame queue comprises a plurality of images.

13. The method of claim 11, wherein the dynamic light intensity threshold is based on a mean light intensity value of a plurality of images captured by the sensor in real-time, the plurality of images present in an image frame queue, the mean light intensity value is configurable to adjust in real-time as additional images are captured by the sensor as the robot travels the route, adjusting of the mean light intensity value corresponds to adjusting of the dynamic light intensity threshold.

14. The method of claim 11, further comprising:
   storing the at least one image in an image frame queue without applying the at least one mask if the mean light intensity value does not exceed the dynamic lighting intensity threshold.

15. The method of claim 11, wherein,
   the at least one mask comprises a pixel-wise determination of the false positive based on the dynamic light intensity threshold, the false positive comprises of a plurality of pixels, and
   the determined plurality of pixels of the false positive is masked to eliminate the false positive from the at least one image.

16. The method of claim 11, further comprising:
   determining intensity values of respective images of the plurality of images within an image frame queue.

17. The method of claim 16, further comprising:
   a respective intensity value corresponding to a respective image of the plurality of images stored in the image frame queue.

18. The method of claim 17, wherein the mean intensity value that is an average of the respective intensity value corresponding to the respective image of the plurality of images.

19. The method of claim 11, further comprising:
   removing the at least one mask after the robot travels past the first location.

20. The method of claim 11, wherein the false positive detected is a representation of high intensity broadband electromagnetic waves captured by the at least one sensor.

21. A non-transitory computer readable medium having computer readable instructions stored thereon that when executed by at least one processor device configure the at least one processor device to,
   maneuver, at a first time instance, a robot along a first trajectory along a path;
   detect, at the first time instance, a high intensity broadband electromagnetic wave by a sensor coupled to the robot while the robot maneuvers along the first trajectory; and
   maneuver, at the first time instance, the robot along a second trajectory along the path upon identifying a false positive along the first trajectory due to detection of the high intensity broadband electromagnetic wave, the second trajectory being different from the first trajectory.

22. The non-transitory computer readable medium of claim 21, wherein the at least one processor device is further configurable to execute the computer readable instructions to,
   disregard, at a second time instance, the false positive identified along the first trajectory during the first time instance, and
   maneuver, at the second time instance, the robot along the first trajectory such that the false positive identified along the first trajectory during the first time instance is disregarded.

23. The non-transitory computer readable medium of claim 21, wherein the at least one processor device is further configurable to execute the computer readable instructions to,
   apply at least one mask such that the false positive is not detected as the robot travels the first trajectory along the path.

24. The non-transitory computer readable medium of claim 21, wherein the high intensity broadband electromagnetic wave corresponds to either sunlight, flashlight, or floodlight.

25. The non-transitory computer readable medium of claim 21, wherein the identifying of the false positive is based on the sensor detecting the high intensity broadband electromagnetic wave.

* * * * *